United States Patent [19]

Saitoh

[11] 4,350,735

[45] Sep. 21, 1982

[54] BLANKET FOR OFFSET PRINTING

[75] Inventor: Joichi Saitoh, Hotarugaike-higashi, Japan

[73] Assignee: Kotobuki Seihan Printing Co., Ltd., Osaka, Japan

[21] Appl. No.: 203,506

[22] Filed: Nov. 3, 1980

[30] Foreign Application Priority Data

Nov. 22, 1979 [JP] Japan ................................ 54-151642

[51] Int. Cl.[3] ............................ B32B 5/16; B32B 3/00

[52] U.S. Cl. .................................... 428/328; 428/148; 428/160; 428/250; 428/423.9; 428/424.8; 428/425.9; 428/409; 428/492; 428/909

[58] Field of Search .................. 428/909, 423.9, 425.9, 428/328, 148, 409, 160, 424.8, 250, 492

[56] References Cited

U.S. PATENT DOCUMENTS 3,025,186 3/1962 Gekhout .......................... 428/423.9

4,145,509 3/1979 Bhatia .............................. 428/425.9

4,174,244 11/1979 Thomas .............................. 428/909

FOREIGN PATENT DOCUMENTS 861220 2/1961 United Kingdom ............ 428/423.9

OTHER PUBLICATIONS

"Catalogue of Blankets", Kabushiki Kaisha Kinyosha, Tokyo, Japan 1978.

*Japan Printing Journal,* Kabushiki Kaisha Nihon Insatsu Shinbunsha, Feb. 17, 1979.

*Primary Examiner*—Ellis P. Robinson

*Attorney, Agent, or Firm*—Armstrong, Nikaido, Marmelstein & Kubovcik

[57] ABSTRACT

A blanket for offset printing comprises three layers, namely, a substrate, a rubber layer and an outer layer. The outer layer is formed by applying to the rubber layer an urethane type resin having aluminum powder mixed therein, and the aluminum powder produces an unevenness in the surface of the outer layer which controls the ink transferring ability of the blanket.

2 Claims, 2 Drawing Figures

BLANKET FOR OFFSET PRINTING

BACKGROUND OF THE INVENTION

The present invention relates to a blanket used in offset printing on metal sheets and plastic films.

Conventionally, a blanket for offset printing is formed of a flexible material, whose front surface is formed with a synthetic rubber layer. Since the synthetic rubber layer, or front surface, is in the state of receiving ink during printing process, the vehicle and the like contained in the ink permeate the rubber layer, tending to soften the surface. This phenomenon increases the ability of the blanket surface to carry ink, so that too much ink is transferred to a plastic film, metal sheet or other material to be printed, requiring an increased force of separating the printed material from the blanket surface. Such increase in the separating force does not matter if the printed material is paper, but if the printed material is a metal sheet or plastic film, said increase causes the printed material to greatly curl on the printed-material discharging side, making it impossible to achieve a high printing speed of, e.g., 3,000 sheets per hour or above.

SUMMARY OF THE INVENTION

The present invention has been accomplished in view of the above and provides a blanket for offset printing which is resistant to the vehicle and the like contained in printing ink, which does not curl materials to be printed and which can be applied to high speed printing.

DETAILED DESCRIPTION OF THE INVENTION

Figure 1:
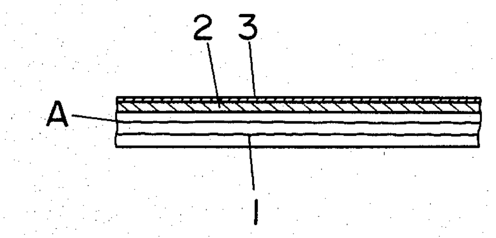
FIG. 1 is an enlarged fragmentary sectional view of an embodiment of the present invention.
Figure 2:
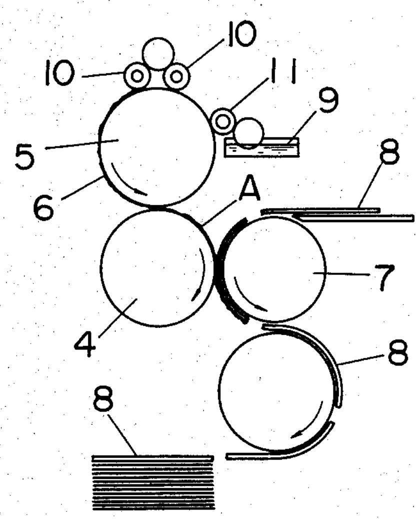
FIG. 2 is a diagrammatic view of an offset press using said embodiment.

Referring to the drawing, a flexible substrate 1 of laminated construction comprising a plurality of rubber-coatable, cotton or other sheets of fabric has a synthetic rubber layer 2, such as NBR, formed on the front surface thereof. An urethane type resin having aluminum powder (whose particle size is 50 to 1,000 mesh) mixed therein is applied to said synthetic rubber layer 2 to form an outer layer 3. The aluminum powder and the urethane type resin, which is liquid, are mixed together in approximately equal volumes and the aluminum powder particles are uniformly distributed in the urethane type resin, with the result that the aluminum powder particles form a fine unevenness on the surface of the outer layer 3. The volume of aluminum powder is measured by filling a measuring cup with said powder in the usual manner without deliberately pressing the same. The blanket A for offset printing according to the invention, in which the substrate 1 is formed with the outer layer 3 with the synthetic rubber layer 2 intervening therebetween, in the manner described above, is attached to the surface of an offset cylinder 4, as shown in FIG. 2. Thus, ink fed to the printing image areas of a so-called PS plate 6 attached to a plate cylinder 5 is transferred to the blanket, from which it is then transferred to a material to be printed 8 fed between an impression cylinder 7 and the offset cylinder 4. Water 9 fed to the non-image areas of the PS plate 6 adheres to the blanket A but cannot penetrate into the blanket because of the presence of the urethane type resin which constitutes the outer layer 3, said urethane type resin also preventing penetration of the vehicle and the like contained in the ink. As a result, the surface of the blanket A will not be softened by the vehicle and the like contained in the ink, and there is no possibility of too much ink being transferred to the blanket A. Thus, a suitable amount of ink can always be transferred to the material 8, preventing the binding force between the blanket and the material 8 from increasing owing to transfer of too much ink as in the past. Accordingly, the material 8 can be easily separated from the blanket A, and even if the material 8 is a relatively hard material, e.g., a plastic sheet or a metal sheet, printing can be easily carried out without curling the sheet while ensuring smooth discharge of sheets. In the drawing, 10 denotes ink feeding rollers and 11 denotes a water feeding roller.

The particle size of said aluminum powder influences the state of the unevenness of the surface of the outer layer 3 such that if it is about 50 to 200 mesh, the ink transferring ability is a little reduced and the blanket is suitable for a printing operation which does not require very high accuracy; if it is about 200 to 300 mesh, the blanket is suitable for solid printing and half-tone printing; and if it is 300 to 1,000 mesh, the blanket is suitable for a printing operation which requires substantial accuracy. Thus, the smaller the particle size, the better the transfer of ink. Further, four-color printing may be carried out by using a printing system which comprises four press units, one of which is shown in FIG. 2, while using blankets of the invention to provide for, e.g., black, deep blue, red and yellow colors.

According to the invention, since the outer layer is formed by coating the rubber layer with an urethane type resin having aluminum powder mixed therein, as described above, it is possible to catch ink by the fine unevenness produced on the rubber layer by said aluminum powder and the presence of the urethane type resin constituting the outer layer prevents the vehicle contained in the ink transferred to the outer layer during printing from penetrating into the interior and from attacking the rubber layer. Thus, the rubber layer does not become softened, so that it can always catch a suitable amount of ink on its surface. It is possible to suppress the occurrence of curls in the printed matter due to excessive ink as it is separated from the blanket. Therefore, plastic sheets, metal sheets and other materials which are liable to curl can be printed at high speeds without causing any trouble to sheet discharge. Further, even if water fed to the non-image areas of the PS plate adheres to the blanket, its penetration into the interior can be prevented, and the blanket can be used a large nubmer of times.

What is claimed is:

1. An offset printing blanket comprising a substrate, a rubber layer, and an outer layer disposed on said rubber layer, said outer layer comprising an urethane type resin having aluminum powder mixed therein, said outer layer having a fine unevenness on its surface produced by said aluminum powder.

2. An offset printing blanket as set forth in claim 1, wherein aluminum powder whose particle size is 50 to 1000 mesh and an urethane type resin are mixed together in equal volumes and said aluminum powder is uniformly distributed in said urethane type resin.

* * * * *